US009313173B2

(12) United States Patent
Davis et al.

(10) Patent No.: US 9,313,173 B2
(45) Date of Patent: Apr. 12, 2016

(54) UNIFIED CONTENT SCANNING AND REPORTING ENGINE

(75) Inventors: Trent H C Davis, Spring Hill (AU); Stephen James Thorne, Greenslopes (AU); James Peter Brotchie, Toowong (AU)

(73) Assignee: Bloomberg L.P., New York, NY (US)

( * ) Notice: Subject to any disclaimer, the term of this patent is extended or adjusted under 35 U.S.C. 154(b) by 202 days.

(21) Appl. No.: 13/122,714

(22) PCT Filed: Dec. 6, 2010

(86) PCT No.: PCT/AU2010/001642
§ 371 (c)(1),
(2), (4) Date: Jul. 28, 2011

(87) PCT Pub. No.: WO2011/069188
PCT Pub. Date: Jun. 16, 2011

(65) Prior Publication Data
US 2011/0289579 A1 Nov. 24, 2011

(30) Foreign Application Priority Data
Dec. 7, 2009 (AU) ................................ 2009905961

(51) Int. Cl.
*H04L 29/06* (2006.01)
*G06F 21/55* (2013.01)
*H04L 29/08* (2006.01)

(52) U.S. Cl.
CPC .......... *H04L 63/0245* (2013.01); *G06F 21/554* (2013.01); *H04L 67/2823* (2013.01)

(58) Field of Classification Search
CPC combination set(s) only.
See application file for complete search history.

(56) References Cited

U.S. PATENT DOCUMENTS

| 7,437,408 | B2 * | 10/2008 | Schwartz | H04L 63/0245 709/204 |
| 8,250,159 | B2 * | 8/2012 | Starbuck | G06Q 10/107 709/206 |
| 8,341,258 | B2 * | 12/2012 | Tsao | H04L 41/0253 709/219 |
| 8,800,053 | B2 * | 8/2014 | Ishida | H04L 63/0245 713/176 |
| 8,856,820 | B2 * | 10/2014 | Chung | H04N 7/163 455/26.1 |
| 2002/0107950 | A1 * | 8/2002 | Lu | 709/223 |
| 2006/0167876 | A1 * | 7/2006 | Benitez et al. | 707/7 |
| 2007/0169184 | A1 | 7/2007 | Krywaniuk | |
| 2007/0266079 | A1 * | 11/2007 | Criddle et al. | 709/203 |
| 2008/0123854 | A1 | 5/2008 | Peel et al. | |
| 2008/0301545 | A1 * | 12/2008 | Zhang et al. | 715/235 |
| 2009/0094222 | A1 | 4/2009 | McColgan et al. | |

FOREIGN PATENT DOCUMENTS

EP  2053530  4/2009

OTHER PUBLICATIONS

PCT/AU2010/0011642, Mar. 7, 2011, Written Opinion and International Search Report.

\* cited by examiner

*Primary Examiner* — Taghi Arani
*Assistant Examiner* — Phy Anh Vu
(74) *Attorney, Agent, or Firm* — Chiesa Shahinian & Giantomasi PC

(57) ABSTRACT

A method of unified content scanning in which content is deconstructed into base formats so as to be presented to content filters in a common format. The base formats include text, image and audio. The invention also includes a system of unified content scanning and a gateway appliance embodying the method of unified content scanning.

20 Claims, 5 Drawing Sheets

US 9,313,173 B2

UNIFIED CONTENT SCANNING AND REPORTING ENGINE

FIELD OF THE INVENTION

The present invention relates to the field of communication security. More particularly, the invention relates to a system, method and apparatus for protecting against leakage of information or exposure to inappropriate content during electronic communication.

BACKGROUND TO THE INVENTION

The Internet has ushered in a communication revolution. Every day there is a phenomenal volume of information being exchanged via numerous electronic communication channels. Email has become the most ubiquitous form of electronic communication but other communication channels have developed and are used extensively. These other channels include instant messaging (which in early forms predates the Internet), social network sites (such as Facebook® and MySpace®), business networking sites (such as LinkedIn® and Plaxo®), micro-blogging services (such as Twitter®) and various web sites that encourage the input of personal information.

It has long been realised that the Internet has an inherent security risk by virtue of the open connection between a user and all other users. The risk is bidirectional in the sense that external threats (such as viruses and Trojans) can attack the computing equipment of a user and that sensitive internal information can be leaked from the user's computing equipment. The problem is particularly significant for a business. While most businesses are aware of the external threats and implement various firewall protocols, they are less aware of the internal threats. For example, inappropriate use of the Internet can leave a business and its owners open to legal action. Also, disgruntled employees have an ever widening range of opportunities to export sensitive company data via any one of the many electronic communication channels available. Perhaps an even greater risk is the possibility of the unintentional leakage of sensitive information.

Various technologies have been developed to try and protect against external attack and some technologies have been developed to try and protect against internal data leakage. These technologies are almost exclusively limited to email scanning, virus checking or web content rating.

For example, U.S. patent application Ser. No. 11/604,286 describes a system and method for managing content for secure communications. The patent is concerned with decrypting encrypted messages so they can be virus checked, spam filtered or have other policy enforcement applied.

U.S. patent application Ser. No. 11/279,213 describes a content upload tool that scans only outbound communications and it is limited to scanning for personal information only.

U.S. patent application Ser. No. 11/331,030 describes a system for processing network content that uses one or more proxies to buffer network content and uses multiple scanning engines to scan content from different network protocols.

U.S. patent application Ser. No. 11/867,880 describes a scanning system that uses a multifaceted scanning engine that applies rules, thresholds and policies to content to produce modified content. The multifaceted scanning engine operates directly on the received content and is limited by the combination of rules, thresholds and policies and each scanning engine must be implemented with a decoding engine for the underlying data structure.

There is no tool available to convert different formats to a common format to facilitate content scanning a broader range of electronic communications.

SUMMARY OF THE INVENTION

In one form, although it need not be the only or indeed the broadest form, the invention resides in a method of unified content scanning by:
 identifying an electronic communication;
 converting the electronic communication to a common format;
 analysing the electronic communication in the common format to identify restricted content; and
 blocking or modifying the restricted content.

In a further form the invention resides in a gateway appliance comprising:
a processor; and
 memory containing an instruction set causing the processor to:
  identify electronic communications passing through the gateway appliance; and
  convert the electronic communications to a common format using an application awareness engine.

The gateway appliance may further comprise a content scanning engine that scans the electronic communications in the common format for restricted content.

In a further form the invention resides in a unified content scanning system comprising:
 an application awareness engine that identifies an electronic communication and converts the electronic communication to a common format; and
 a content scanning engine that scans the electronic communications in the common format for restricted content.

In a still further form the invention resides in a unified content scanning system comprising:
 a gateway appliance for a communication network;
 a processor in the gateway appliance;
 memory in the gateway appliance containing an instruction set causing the processor to:
  identify electronic communications passing through the gateway appliance; and
  convert the electronic communications to a common format; and
  a content scanning engine that scans the electronic communications in the common format for restricted content.

Further features and advantages of the present invention will become apparent from the following detailed description.

BRIEF DESCRIPTION OF THE DRAWINGS

To assist in understanding the invention and to enable a person skilled in the art to put the invention into practical effect, preferred embodiments of the invention will be described by way of example only with reference to the accompanying drawings, in which.

DETAILED DESCRIPTION OF THE INVENTION

Figure 1:
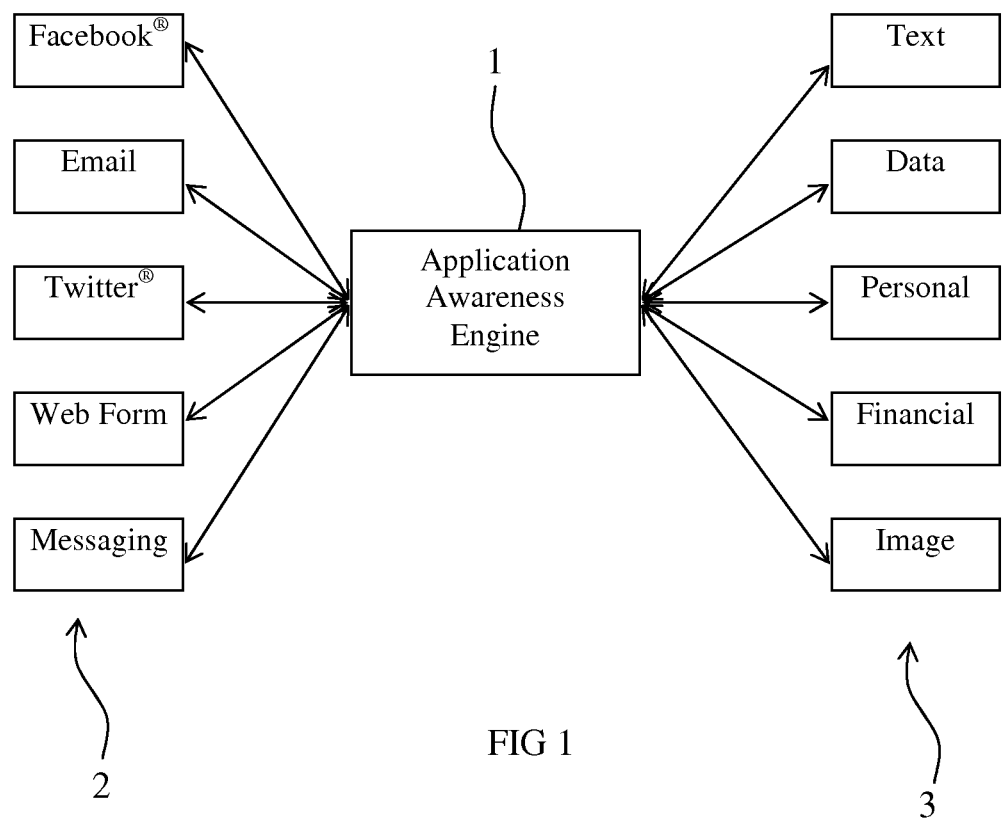
FIG. 1 schematically shows unified content scanning.

Embodiments of the present invention reside primarily in unified content scanning. Accordingly, the embodiments of the invention have been illustrated in concise schematic form in the drawings, showing only those specific details that are necessary for understanding the embodiments, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus.

Referring to FIG. 1, the invention provides an application awareness engine 1 that provides an interface between applications 2 and filters 3. The application awareness engine 1 processes content uploaded from or downloaded to the applications 2 and passes the content in a common format to one or more of the filters 3. The application awareness engine 1 deconstructs the content into chunks that are a base format. The inventors consider that the three base formats are text, image and audio but recognise that other base formats may be developed in the future. There may also be variations on these base formats, for instance video can be treated as a bunch of images and audio, or could be treated as another base format.

There are numerous applications 2 that are a source of potential risk due to the ability to upload or download malicious or inappropriate content. A non-exhaustive list of applications includes: Facebook®; Email; Twitter®; Web Forms; Instant Messaging; Gmail etc. Many of these applications can transfer content in different forms. For example, a Facebook® user can post text onto their own wall, can upload images, can post text onto the wall of another user, and can download images. Similarly, email can have attachments such as documents and images. Email may even have attachments which themselves have attachments, such as .ZIP files and other emails.

For many of these applications there are content filters which seek to limit the upload or download of inappropriate content. A non-exhaustive list of filters includes: text filters that filter for inappropriate words; data filters that filter for corporate data leakage; personal information filters that filter for addresses, telephone numbers; financial filters that filter for bank account details; image filters that filter for a selected group of inappropriate images or certain colours like flesh tones; etc. The known filters are specific to applications. Thus a data filter, such as described above in the background section, will either be useful only for one application, such as email, or will have a different version for other applications, such as web forms. In contrast the application awareness engine 1 deconstructs the content to base formats that are recognisable by any filter.

Figure 2:
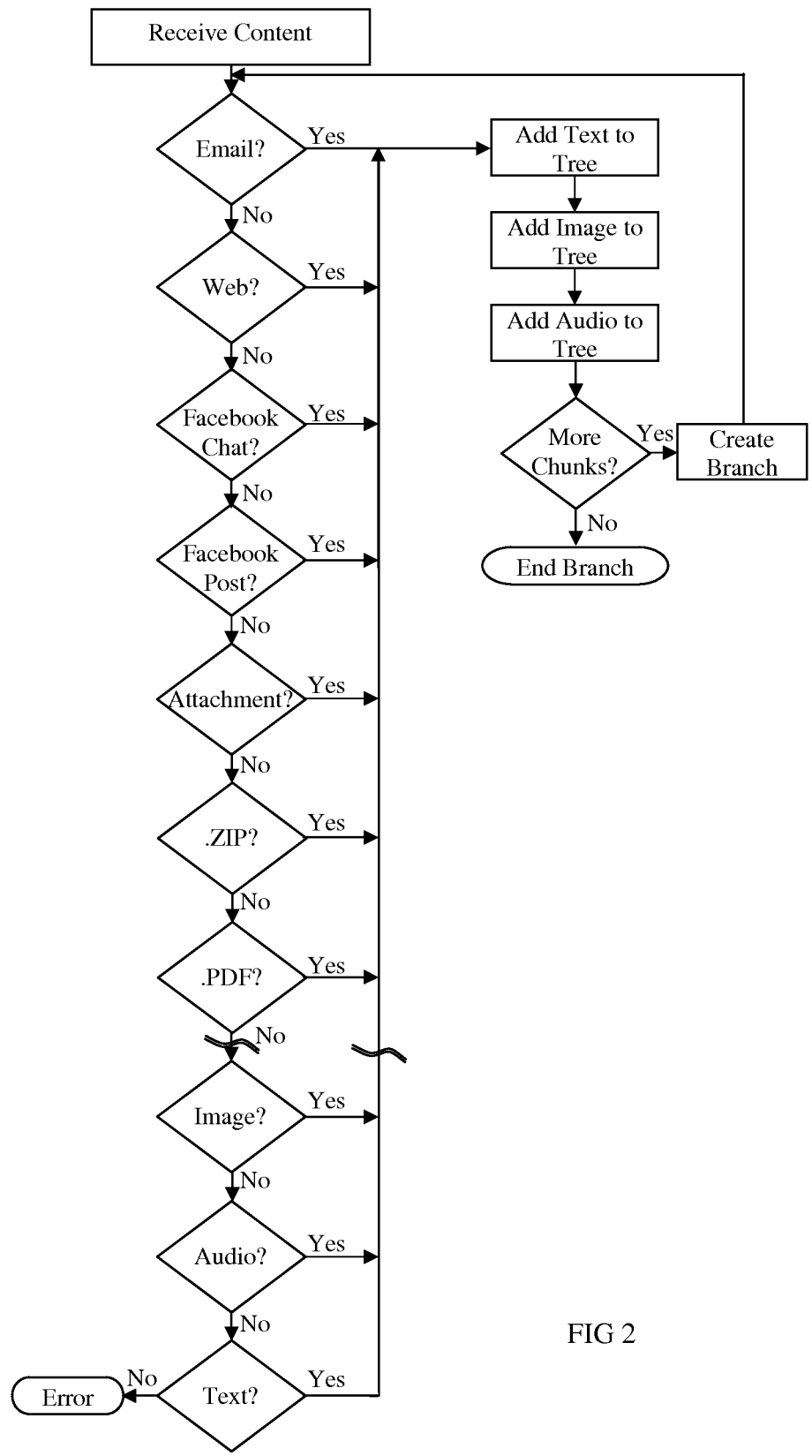
FIG. 2 shows a method of an application awareness engine of FIG. 1.

The process of deconstruction is outlined in FIG. 2. The method of the application awareness engine 1 commences with content passing to the application awareness engine. The content is scanned to identify the type of content. As shown in FIG. 2, the various types are checked in order. First it is decided whether the content is an email. If it is, any identified text, such as the subject line or the body text, is added to a tree structure. The remaining material is then parsed for other base formats and any images or audio are added to the tree. The content is then checked for other content. For instance, an email may have attachments or embedded files. If so, the remaining content is rescanned. If not the process is ended and the content tree is established.

When remaining content is rescanned the first check will be if the remaining chunks are emails (such as an email attachment to an email). If not the next check is made, in the example a check for whether the content is a web page, if not the process continues as shown in FIG. 2. For clarity, not all possible content chunks are shown in FIG. 2, for instance HTML is not shown. Furthermore, there may be other content forms in the future which would then form part of the invention.

The end of the checking train is whether the content is an image, audio or text. It should be noted that video content is treated as multiple images, but in another embodiment video could be considered as another type of base format. If none of the checks returns a 'yes' flag a message is generated such as "unknown content type" to indicate that the content is not recognised. A new module may be added for the new content type.

The content may loop through the process one or more times until the content is deconstructed into multiple chunks of image, audio and text. By way of example, an email with a document attachment having embedded images may result in four chunks being a text chunk for the subject of the email, a text chunk for the body of the email, a text chunk for the document and an image chunk for the image embedded in the document.

The deconstructed chunks are then in a form to be scanned by the appropriate filters 3. The scanning may result in modification or blocking of content depending on whether the chunks are mutable or not. The original content is then reconstructed by the application awareness engine by building the content from the tree in reverse order, albeit with some content modified or removed. The content is then transmitted in the usual manner.

Figure 3:
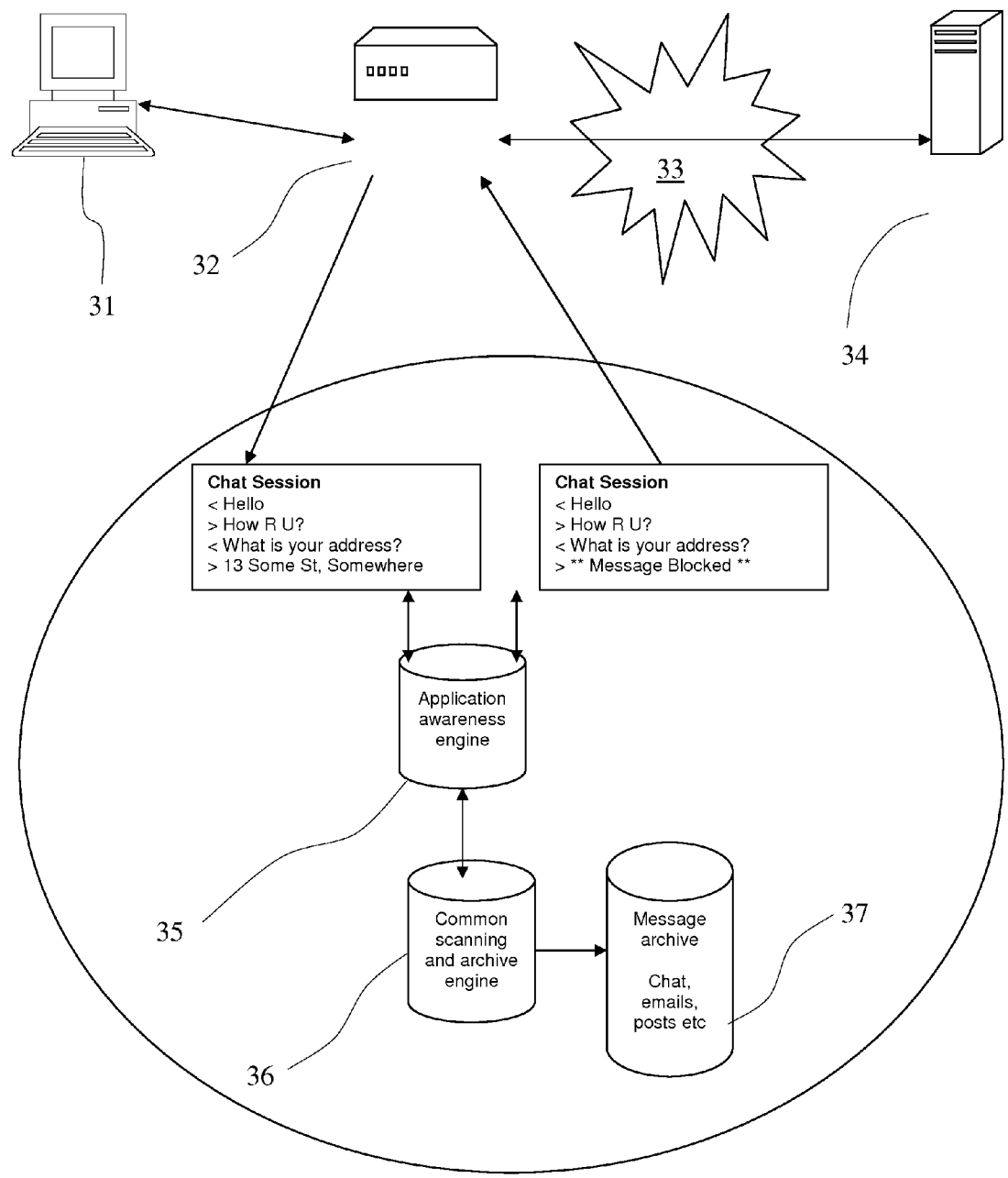
FIG. 3 depicts a first embodiment of scanning various communication protocols in a communication network.

In order to exemplify the invention a number of examples of content scanning are described below. Referring to FIG. 3 there is a shown a schematic of a typical home or business communication arrangement. A user operates a personal computer 31 that is connected through a gateway appliance 32 to the Internet 33. For convenience the invention will be described by reference to the communications network known as the Internet, but persons skilled in the art will appreciate that it is applicable to any communication network.

The user has access to a range of resources 34 via the Internet 33. These resources will include various resources such as web sites, other users, data storage sites and information servers. The user may choose to communicate with these resources 34 by various protocols. The range of available communication protocols is ever increasing but a non-exhaustive list is provided above. Each of these different communication options uses a different data packet format making it difficult to scan for forbidden content. For instance, a business may have an email content scanning engine that has a rule set that strips financial data from all outgoing emails but this will not prevent a person from sending financial data via Gmail® or instant messaging. Another example is at home where a parent may be able to use content scanning to prevent a child from passing personal information via email but may not be able to prevent the same personal information being written on a Facebook® wall. A person may also be able to upload data via FTP that would not otherwise be allowed to be transferred by email or web mail.

In FIG. 3 the example of a chat session is shown in which a user is in danger of releasing a personal address. The gateway appliance 32 recognises and intercepts the instant message. This may be done using a variety of techniques. For instance, many instant messaging clients run on known TCP and/or UDP ports. If traffic is detected on these ports it is assumed to be an instant message. Another example is communication on a web site such as Facebook®, when a user posts to their "Facebook Wall" the page/application is generally the same for every user. The message is converted to a common format by an application awareness engine 35 in the manner outlined in FIG. 2.

As depicted in FIG. 3 an application awareness engine scans for each communication protocol. In the example the application awareness engine identifies the content as an instant message and the content is deconstructed into text. The inventors envisage that a new application awareness engine module could be loaded to the gateway appliance 32 at the same time as the communication application is installed on the personal computer 31. Thus, if a user installs a new chat application a chat application deconstruction module would be loaded to the application awareness engine 35 in the gateway appliance 32. In the embodiment the application awareness engine is software stored in memory in the gateway appliance 32. Alternatively the application awareness engines may be distributed in a "computing cloud" accessible by the gateway appliance. Accessing an application awareness engine from the cloud means that all application awareness engine modules are available at all times without a need to upgrade the gateway appliance. Persons skilled in the field will understand a computing cloud to mean a distributed network of computing resources accessible via the Internet that are not necessarily owned by the user.

The application awareness engine presents a standard Application Programming Interface (API) to a scanning engine 36. The scanning engine may be software stored in memory in the gateway appliance 32 or alternatively may be accessible in a "computing cloud". To do this the application awareness engine searches for patterns in the data stream. This data stream may have been partially deconstructed by a previous pass through the application awareness engine method (as explained by reference to FIG. 2). The application awareness engine then extracts common fields from the encoded message. Every message has at least some of the following fields (which may or may not have content for a given message):

Application (eg. Facebook®)
Type (eg. chat)
From
To
Subject
Body Parts (which may be text, attachments, pictures, etc).

The Body Parts section typically includes a MIME encoded message (or text for simple applications). MIME is the protocol used by email, web and most instant messaging protocols. Various different body parts (such as attachments) are referred to as "chunks". As outlined above the content is deconstructed in to base formats of text, image and audio for presentation to the content scanning engine.

A content scanning engine 36 scans the electronic communication in the common format to identify and remove restricted content. The process is most commonly rule-based but adaptive learning techniques may also be applicable. The inventors envisage that there would be a core rule set that is activated at commissioning of the system and a user-defined rule set that is developed over time. Various processes for rule set development are known and do not form part of the invention.

By way of example the following pseudocode describes the operation of one form of the document (chunk) creation by the application awareness engine 35 and used by the content scanning engine 36.

```
knownstreams = (EmailDocument, FacebookChatDocument,
FacebookMessageDocument, TwitterPostDocument...)
class Document
    method GetText( )
        // A sample of a method that could be common on all documents
    method GetAttachements( )
        // A sample of a method that could be common on all documents
    method Block( )
        // A sample of action that could be common on all documents
    method Replace(text)
        // A sample of action that could be common on all documents
    method ProcessStream(datastream)
        // This method populates a common document
    method ReturnStream(datastream)
        // This method modifies the stream (if required), based on the
        // actions taken (eg: Block and Replace).
    method Match(datastream)
        // Figures out if this stream matches this document
function FacebookChatDocument(extends Document):
    // implements all of Documents methods
function ProcessStream(datastream)
    document = GetDocument(datastream)
    if document != unknown
        action = CheckRules(document)
        if action.block
            document.block( )
        if action.replace
            document.replace(action.replacestring)
function GetDocument(datastream)
    for type in knowndocuments
        if type.match(datastream)
            return type.documentparser(datastream)
    return unknown
function CheckRules(document)
    // Check rules can work through every document without having to
    // know anything about the underlying application.
    // Actions can also be taken as desired - again with no understanding
    // of the underlying stream.
    // This is just an example of how rules may be processed. A similar method
    // is adopted for logging and recording of activity.
    for rule in rulechain
        match = rule.ProcessDocument(document)
        if match
            action = rule.action( )
```

For reporting purposes a log of scanning activity may be kept in local storage 37. Local storage 37 may also maintain a complete log of all electronic communication in the common format. This greatly simplifies the task of monitoring user communications. A business seeking to check the communication history of a user currently has great difficulty due to the range of available communication options. The process of monitoring is greatly simplified by converting electronic communications to a common format.

Although the embodiment is described in terms of local storage it will be appreciated by persons skilled in the art that the storage merely needs to be accessible. Central storage, external storage or storage in a data cloud would all be suitable.

When a traffic stream is intercepted it is usual to wait for the entire message to be sent from the client before sending it off to the remote server 34. This allows the content scanning engine 36 to scan the full message, and either block it, allow it or modify it, before sending on to the remote server. This has minimal impact on the user experience as messages are small, and the limiting factor is the internet speed, so the message leaves the client practically instantly (either over the LAN or on the local PC), and is then scanned as a whole, and "trickled" to the internet.

The invention can handle MIME messages and various types of attachments. For example, if a PDF document is sent via email, web mail or file transfer the message is intercepted by the application awareness engine 35 and deconstructed into base formats. The text or image from the PDF document is sent to the content scanning engine 36. The content scanning engine scans the text and takes appropriate action to block the PDF document or modify it if the content scanning engine is configured to edit the PDF document.

The application awareness engine 35 recognises whether the content of the fields is mutable and sets a flag in the API that is readable by the content scanning engine. Each field and each chunk of the Body Part field is considered to be potentially mutable so a flag is set for each field or chunk rather than for the whole message. If mutable that content may be changed, as depicted in FIG. 3. If a field or chunk is not mutable the content scanning engine passes a message back to the application awareness engine to block the field, the chunk, or the entire message.

The application awareness engine 35 includes appropriate routines to block a message if requested by the content scanning engine, and to re-encode a message for sending if it is mutable and has been changed. By way of example, an appropriate routine for an email may be to block inappropriate content substitute a message that the content is inappropriate, for a web page it may be to simply block the page.

A message when completely decoded into chunks is presented in a "tree" format. This allows for the nesting of different types of data. For example, a message may have a ZIP chunk. The chunk decoding will then extract that into several parts, containing say text from a PDF and text from a document. When the content scanning engine traverses this message tree it can, using the common API, inspect all text in both the PDF and document with no further programming. Further to this, should the text need to be changed in the document, if the API flags the chunk as mutable, it can change the document. This chunk would be marked as "dirty", and this information would be sent up the message tree. When the application awareness engine receives the message, it then re-serialises the message, and sends it on, with the changes in place because the root of the message tree flagged that this message had been changed.

The embodiment described above has used instant messaging as an example. If the message is traffic or HTTP (or HTTPS), the URL of each request is inspected, and if it matches a registered URL pattern, it is processed by the appropriate module of the awareness engine registered for the pattern. For example a request to *facebook.com/* will automatically be processed by the Facebook® awareness engine module (as shown in FIG. 2). The application awareness engine 35 may have multiple components for each type of communication, eg: chat, post etc. For protocols such as email which are extremely standard, the known ports are monitored for email traffic using existing inspection technologies. This could be in the form of an email gateway where all outgoing traffic is sent anyway, or through transparent interception. For other applications "signatures" are detected on each packet to determine the application, if a matching application is detected, it is passed to the relevant application awareness engine. This is ideal for protocols that use dynamic ports (eg: BitTorrent).

Figure 4:
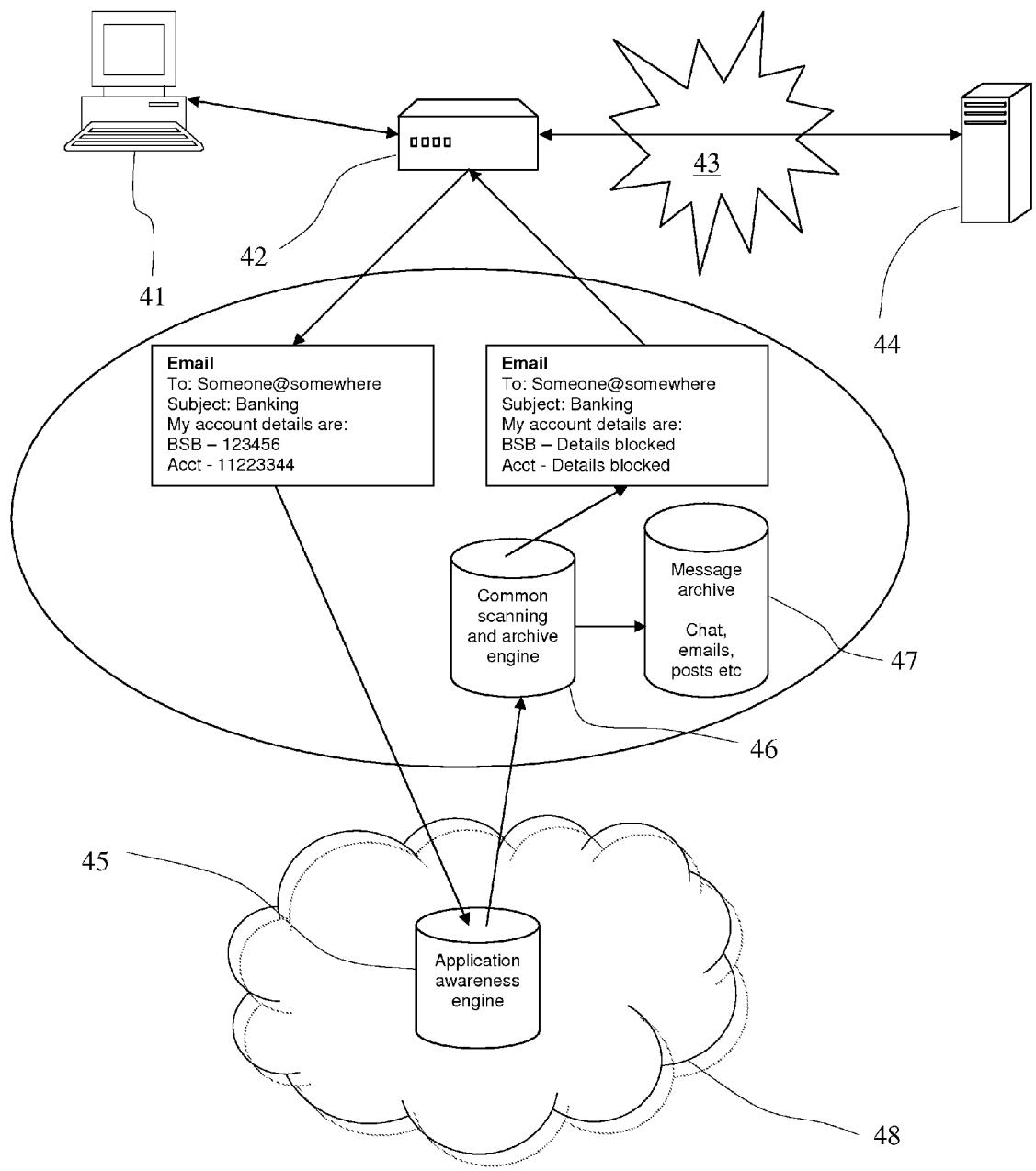
FIG. 4 depicts a second embodiment of scanning various communication protocols in a communication network.

An example of an embodiment implementing a computing cloud is depicted in FIG. 4. A user operates a personal computer 41 that is connected through a gateway appliance 42 to the Internet 43. The user has access to a range of resources 44 via the Internet 43. In the example of FIG. 4 the user is sending an email to somebody@somewhere. The email contains financial information such as bank account details. The gateway appliance 42 recognises the email format and redirects the email to the application awareness engine 45 in the computing cloud 48 that is specifically for email. The application awareness engine 45 converts the email to a common API for scanning by content scanning engine 46. In the embodiment of FIG. 4 the content scanning engine 46 resides on the gateway device 42 but persons skilled in the field will appreciate that the content scanning engine 46 could also reside in the computing cloud 48. The email is identified as being unsafe but mutable so the offensive content is blocked and the modified email is returned to the gateway device 42 for continued forwarding. As with the first embodiment, the activity may be recorded in a log on local storage 47.

The invention is not limited to implementation in a gateway appliance. The only requirement is that messages are intercepted and passed to the application awareness engine. The invention could be implemented as an application on a personal computer or as an application on a server in a client/server network. An example of a client server implementation is depicted in FIG. 5.

Figure 5:
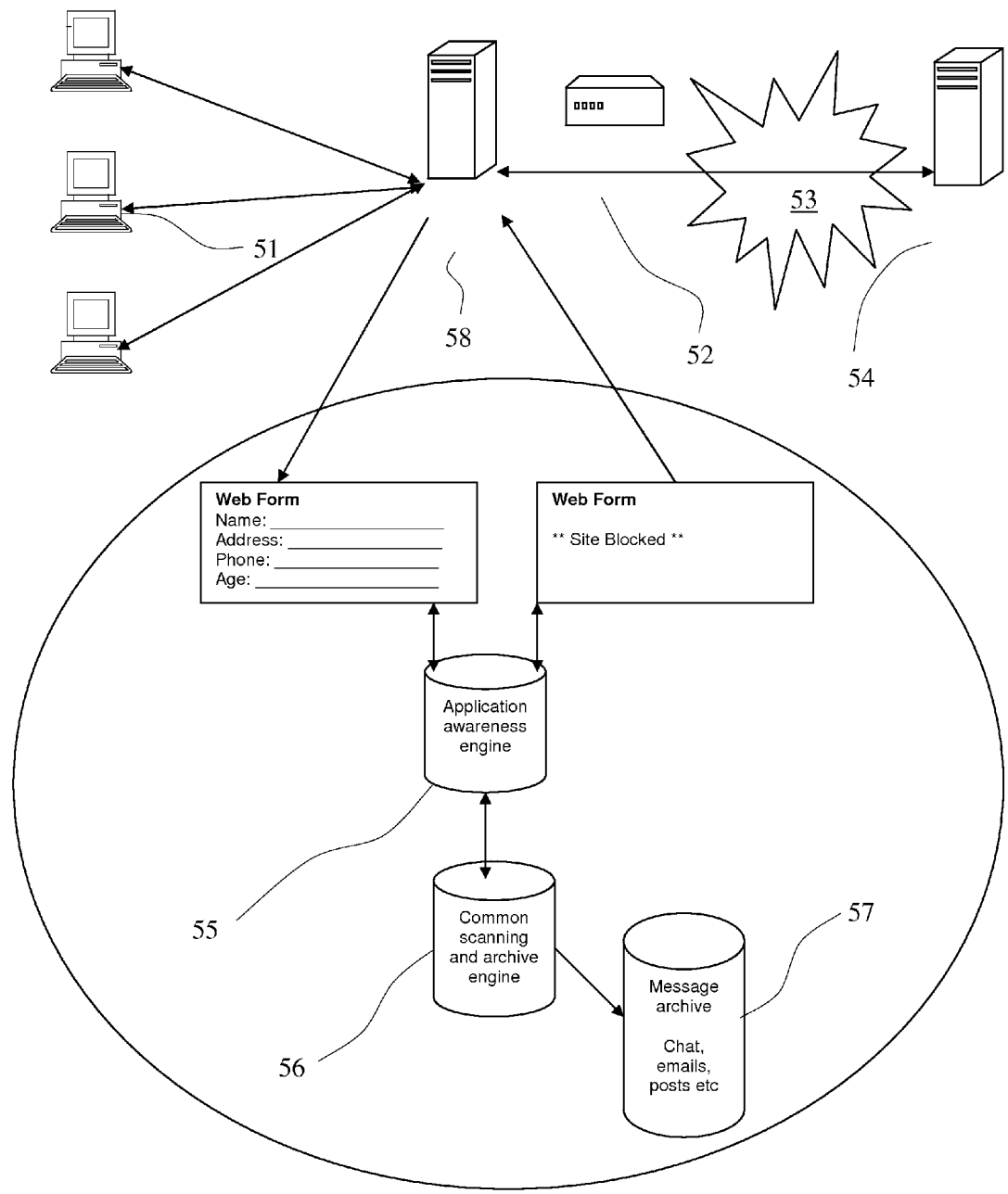
FIG. 5 depicts a third embodiment of scanning various communication protocols in a communication network.

Referring to FIG. 5 there is a shown a schematic of a typical business client/server arrangement. A user operates a computer 51 that is connected to a server 58. The user may access external resources 54 via the Internet 53 through a gateway appliance 52. For example, the user may access a remote web site that seeks private information in a web form. The URL of the site is detected by the unified content scanning invention running on the server 58. The application awareness engine 55 has a module for HTTP converts the pages to a common API (text, image and audio) for scanning by the content scanning engine 56. The web form is identified as being unsafe and immutable. The form is therefore blocked. As with the first embodiment, the activity may be recorded in a log on local storage 57.

A similar approach is taken with upload of files, such as attachments to web mail or web forms. The application awareness engine temporarily caches any uploaded files, and when the user presses "send", the application awareness engine presents the body of the message, and all attachments to the common API.

The client/server embodiment of FIG. 5 has the added advantage of facilitating unified content scanning of internal communications. For instance, staff can be prevented from using internal company communication channels to pass inappropriate jokes, comments and photos.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this invention is intended to embrace all alternatives, modifications and variations of the present invention that have been discussed herein, and other embodiments that fall within the spirit and scope of the above described invention.

The invention claimed is:

1. A method for preventing leakage of information or exposure to inappropriate content during electronic communications, the method comprising:
   intercepting a person-to-person electronic communication;
   determining a type of the electronic communication;
   converting content of the electronic communication to a common format, the content of the electronic communication corresponding to one or more of any of text, audio, and image;
   parsing the content of the electronic communication in the common format into chunks that are added to a content tree, each chunk conforming to one of a plurality of base formats, the base formats being selected from a group including text, audio and image;
   analyzing the content of each chunk in the respective base format to identify restricted content that is not to be received or transmitted;
   reconstructing a modified electronic communication by building content thereof from the content tree, modifying or removing the identified restricted content as the modified electronic communication is reconstructed; and
   transmitting the modified electronic communication in place of the intercepted electronic communication so as to prevent leakage of the identified restricted content or exposure to the identified restricted content.

2. The method of claim 1 wherein the step of determining the type of the electronic communication comprises checking the electronic communication for identifying patterns in a data stream.

3. The method of claim 1 wherein the step of converting includes deconstructing the content into further base formats.

4. The method of claim 1 wherein the step of analyzing comprises filtering the content in the common format using content filters.

5. The method of claim 4 wherein the content filters are selected from one or more of:
   a lexicon of inappropriate words;
   data templates;
   flesh tone filters; and
   personal information templates.

6. The method of claim 1, wherein the electronic communication is a first person-to-person electronic communication and the method further comprises:
   identifying a second person-to-person electronic communication that is a different type of communication than the first electronic communication;
   converting content of the second electronic communication to the common format;
   analyzing the content of the second electronic communication in the common format to identify restricted content of the second electronic communication; and
   blocking or modifying the restricted content of the second electronic communication.

7. The method of claim 6, wherein the type of communication of the first electronic communication and the type of communication of the second electronic communication each correspond to one of the following: an email communication, a web communication, a Facebook chat, a Facebook post, and a download or upload of an attached file.

8. The method of claim 1 wherein the electronic communication is stored in the common format.

9. A gateway appliance comprising:
   a processor; and
   memory containing an instruction set causing the processor to:
      identify person-to-person electronic communications passing through the gateway appliance; and
      for each electronic communication:
         determine a type of the electronic communication;
         convert content of the electronic communication to a common format using an application awareness engine, the content of the electronic communication corresponding to one or more of any of text, audio, and image;
         parse the content of the electronic communication in the common format into chunks that are added to a content tree, each chunk conforming to one of a plurality of base formats, the base formats being selected from a group including text, audio and image;
         analyze the content of each chunk in the respective base format to identify restricted content that is not to be received or transmitted;
         reconstruct a modified electronic communication by building content thereof from the content tree, modifying or removing the identified restricted content as the modified electronic communication is reconstructed; and
         transmit the modified electronic communication.

10. The gateway appliance of claim 9 wherein the instruction set contained in the memory causes the processor to deconstruct the content into further base formats.

11. The gateway appliance of claim 9 wherein analyze the content of each chunk is performed by a content scanning engine.

12. The gateway appliance of claim 9, wherein:
   identify person-to-person electronic communications passing through the gateway appliance comprises identify first and second person-to-person electronic communications passing through the gateway appliance, the second electronic communication being a different type of communication than the first electronic communication; and
   convert content of the electronic communications to the common format using the application awareness engine comprises convert content of the first and second electronic communications to the common format using the application awareness engine.

13. The gateway appliance of claim 12, wherein the type of communication of the first electronic communication and the type of communication of the second electronic communication each correspond to one of the following: an email communication, a web communication, a Facebook chat, a Facebook post, and a download or upload of an attached file.

14. The gateway appliance of claim 9 wherein the instruction set contained in the memory causes the processor to store each electronic communication in the respective common format.

15. A unified content scanning system comprising:
   a processor; and
   memory containing an instruction set that is executed by the processor, the instruction set comprising:
      an application awareness engine that causes the processor to:
         identify a person-to-person electronic communication;

determine a type of the electronic communication;
convert content of the electronic communication to a common format, the content of the electronic communication corresponding to one or more of any of text, audio, and image; and
parse the content of the electronic communication in the common format into chunks that are added to a content tree, each chunk conforming to one of a plurality of base formats, the base formats being selected from a group including text, audio and image; and a content scanning engine that causes the processor to analyze the content of each chunk in the respective base format to identify restricted content that is not to be received or transmitted,
wherein once the content of each chunk in the respective base format has been analyzed by the content scanning engine the application awareness engine:
reconstructs a modified electronic communication by building content thereof from the content tree, modifying or removing the identified restricted content as the modified electronic communication is reconstructed; and
transmits the modified electronic communication.

16. The unified content scanning system of claim 15 further comprising:
a gateway appliance for a communication network;
a processor in the gateway appliance; and
memory in the gateway appliance containing an instruction set causing the processor to:
identify a type of electronic communication from content of the electronic communications passing through the gateway appliance; and
convert the content of the electronic communications to a common format in the application awareness engine.

17. The unified content scanning system of claim 15 wherein the instruction set contained in the memory causes the processor to deconstruct the content into further base formats.

18. The unified content scanning system of claim 15, wherein the electronic communication is a first person-to-person electronic communication, and wherein:
the application awareness engine causes the processor to identify a second person-to-person electronic communication that is a different type of communication than the first electronic communication and convert content of the second electronic communication to the common format; and
the content scanning engine causes the processor to scan the content of the second electronic communication in the common format for restricted content.

19. The gateway appliance of claim 18, wherein the type of communication of the first electronic communication and the type of communication of the second electronic communication each correspond to one of the following: an email communication, a web communication, a Facebook chat, a Facebook post, and a download or upload of an attached file.

20. The unified content scanning system of claim 15 wherein the instruction set contained in the memory causes the processor to store the electronic communication in the common format.

* * * * *